United States Patent
Ohsawa

(10) Patent No.: US 10,628,734 B2
(45) Date of Patent: Apr. 21, 2020

(54) EFFICIENT DETERMINATION OF OPTIMIZED LEARNING SETTINGS OF NEURAL NETWORKS

(71) Applicant: INTERNATIONAL BUSINESS MACHINES CORPORATION, Armonk, NY (US)

(72) Inventor: Shohei Ohsawa, Kunitachi (JP)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 15/099,394

(22) Filed: Apr. 14, 2016

(65) Prior Publication Data

US 2017/0300812 A1    Oct. 19, 2017

(51) Int. Cl.
  *G06N 3/08*    (2006.01)
  *G06N 3/04*    (2006.01)

(52) U.S. Cl.
  CPC ............ *G06N 3/08* (2013.01); *G06N 3/0454* (2013.01)

(58) Field of Classification Search
  CPC ........ G06N 7/005; G06N 3/04; G06N 3/0472; G06N 3/063; G06N 3/08; G06N 3/006; G06N 5/02
  See application file for complete search history.

(56) References Cited

U.S. PATENT DOCUMENTS

| | | | | |
|---|---|---|---|---|
| 2007/0244842 A1* | 10/2007 | Ishii | ............. | G06K 9/4628 706/18 |
| 2011/0081089 A1* | 4/2011 | Mori | ............. | G06K 9/00281 382/218 |
| 2012/0269200 A1* | 10/2012 | Aggarwal | ............. | H04L 47/00 370/410 |
| 2015/0127336 A1* | 5/2015 | Lei | ............. | G10L 17/18 704/232 |

FOREIGN PATENT DOCUMENTS

WO    WO2014205231 A1    12/2014

OTHER PUBLICATIONS

Chilimbi, T. et al., "Project Adam: Building an Efficient and Scalable Deep Learning Training System," Proceedings of the 11th USENIX Symposium on Operating Systems Design and Implementation, Oct. 2014. (pp. 1-13).
Coates, A. et al., "Deep learning with COTS HPC systems," Proceedings of the 30 th International Conference on Machine Learning, Jun. 2013. (pp. 1-9).

(Continued)

*Primary Examiner* — Lut Wong
(74) *Attorney, Agent, or Firm* — Tutunjian & Bitetto, P.C.; Vazken Alexanian

(57) ABSTRACT

A method comprising calculating output values of a plurality of linear nodes connected to a maxout node in a neural network, calculating a temporary maximum value among the output values during the calculation of the output values, and terminating the calculation of a final output value of a (Continued)

first linear node of the plurality of linear nodes in response to a condition that a difference between the temporary maximum value and a temporary output value of the first linear node exceeds a threshold value during the calculation of the output values.

20 Claims, 12 Drawing Sheets

(56) References Cited

OTHER PUBLICATIONS

Goodfellow, I.J. et al., "Maxout Networks," Proceedings of the 30th International Conference on Machine Learning, Jun. 2013. (pp. 1-9).
Hagan, M. et al., "Training Feedforward Networks with the Marquardt Algorithm," IEEE Transactions on Neural Networks, vol. 5, No. 6, Nov. 1994. (pp. 989-993).
Marquardt, D. W., "An Algorithm for Least-Squares Estimation of Nonlinear Parameters," Journal of the Society for Industrial and Applied Mathematics, vol. 11, No. 2, Jun. 1963. (pp. 1-12).
Ranzato, M.A. et al., "Efficient Learning of Sparse Representations with an Energy-Based Model," Advances in Neural Information Processing Systems 19, Dec. 2006.
Vincent, P. et al., "Stacked Denoising Autoencoders: Learning Useful Representations in a Deep Network with a Local Denoising Criterion," Journal of Machine Learning Research, vol. 11, Mar. 2010. (pp. 1-38).

\* cited by examiner

| input | $v_2$ | $v_1$ |
|---|---|---|
| ... | $0.99(w_{13,1})$ | $0.98(w_{14,1})$ |
| ... | $0.96(w_{11,1})$ | $0.97(w_{12,1})$ |
| ... | ... | ... |
| ... | ... | ... |

*FIG. 10*

EFFICIENT DETERMINATION OF OPTIMIZED LEARNING SETTINGS OF NEURAL NETWORKS

BACKGROUND

Technical Field

The present invention relates to efficient processing of neural networks including maxout layer(s) in machine learning.

Related Art

Deep Neural Network (or DNN) has become increasingly important as a method for machine learning. A neural network having a stack of function approximators based on a piecewise linear function has scored high accuracies in image recognition and voice recognition tasks. For example, a maxout network is known as disclosed in "I. J. Goodfellow, D. Warde-Farley, M. Mirza, A. Courville, and Y. Bengio: Maxout Networks, In Proceedings of the 30th International Conference on Machine Learning (2013)."

While the maxout network has a higher generalization performance than other neural networks, the maxout network requires a great amount of computation resources and time due to computation in the maxout layer. Therefore, there exists a need for reducing computation in the maxout layer.

SUMMARY

Therefore, it is an object of an aspect of the innovations herein to provide an apparatus capable of overcoming the above drawbacks accompanying the related art. The above and other objects can be achieved by the combinations recited in the claims. A first aspect of the innovations herein may include a method including calculating output values of a plurality of linear nodes connected to a maxout node in a neural network, determining a temporary maximum value among the output values during the calculation of the output values, and terminating the calculation of a final output value of a first linear node of the plurality of linear nodes in response to a condition that a difference between the temporary maximum value and a temporary output value of the first linear node exceeds a threshold value during the calculation of the output values. Embodiments of the invention that include these features may make it possible to terminate calculation of a part of the plurality of linear nodes that does not influence the output of the maxout node, thereby improving efficiency of the computation of the maxout network.

Each linear node of the plurality of linear nodes may be connected to a plurality of inputs, and the calculating output values may include calculating a final output value of each linear node based on the plurality of inputs and a plurality of weight values, the plurality of weight values associated between the plurality of inputs and the linear node. Embodiments of the invention that include these features may improve efficiency of the computation of the maxout network.

The calculating the final output value from each linear node may include multiplying each input of the plurality of inputs and corresponding weight value of the plurality of weight values and adding the result of multiplication, and the terminating may include terminating remaining multiplication and accumulation of the calculation of the final output value. Embodiments of the invention that include these features may improve efficiency of the computation of the maxout network by terminating the multiplication and accumulation.

The calculating output values may include sorting the plurality of inputs in descending order. Embodiments of the invention that include these features may accelerate the computation of the maxout network.

The calculating output values may include calculating, for a first part of the plurality of inputs, temporary output values of the plurality of linear nodes, the determining the temporary maximum value may include determining, for the first part of the plurality of inputs, the temporary maximum value, the terminating may include terminating the calculation of the final output value from a linear node in response to a condition that a difference between the temporary maximum value and a temporary output value of the linear node for the first part of the plurality of inputs exceeds the threshold value. Embodiments of the invention that include these features may improve efficiency of the computation of the maxout network in parallel computation of output values.

The method may further comprise generating the threshold value based on at least one of the plurality of weight values and the plurality of inputs. Embodiments of the invention that include these features may improve efficiency of the computation of the maxout network.

The generating may include generating the threshold value based on each maximum weight value among weight values defined between each of the plurality of inputs and the plurality of linear nodes. Embodiments of the invention that include these features may improve efficiency of the computation of the maxout network.

The generating may include generating the threshold value based on a maximum weight value among the plurality of weight values defined between the plurality of inputs and each of the plurality of linear nodes. Embodiments of the invention that include these features may improve efficiency of the computation of the maxout network.

The generating may include generating the threshold value based on the maximum weight value among the plurality of weight values defined between the plurality of inputs except for the first part of the plurality of inputs of each of the plurality of linear nodes. Embodiments of the invention that include these features may improve efficiency of the computation of the maxout network.

The calculating output values may include adding the next two or more inputs to the first part of the plurality of inputs, and calculating the temporary output values of the plurality of linear nodes. Embodiments of the invention that include these features may improve efficiency of the computation of the maxout network by computation of the temporary output value for the plurality of inputs at once.

The calculating output values may include calculating output values of a first part of the plurality of linear nodes, the determining the temporary maximum value may include selecting a maximum output value of the first part of the plurality of linear nodes as the temporary maximum value, and the terminating may include terminating the calculation of an output value from a linear node excluded from the first part of the plurality of linear nodes in response to a condition that a difference between the temporary maximum value and a temporary output value of the linear node exceeds the threshold value. Embodiments of the invention that include these features may improve efficiency of the computation of the maxout network in sequential computation of output values.

The method may further comprise generating the threshold value based on at least one of the plurality of weight values and the plurality of inputs. Embodiments of the invention that include these features may improve efficiency of the computation of the maxout network in sequential computation of output values.

The generating may include generating the threshold value based on each of the maximum weight values among weight values defined between each of the plurality of inputs and the remaining nodes excluded from the first part of the plurality of linear nodes. Embodiments of the invention that include these features may further improve efficiency of the computation of the maxout network in sequential computation of output values.

The method may further comprise creating, for a first input of the plurality of inputs, a weight table including weight values between the first input and the plurality of linear nodes, the weight values being sorted in descending order, and the generating may include generating the threshold value by using the maximum weight value from the weight table between the first input and the plurality of linear nodes excluded from the first part of the plurality of linear nodes, and disabling the maximum weight value in the weight table in response to a condition that the corresponding linear node is added to the first plurality of linear nodes. Embodiments of the invention that include these features may further improve efficiency of the computation of the maxout network in sequential computation of output values.

Additional aspects of the innovations herein may include an apparatus capable of performing the methods of the above first aspect, and a computer program product comprising a computer readable storage medium having program instructions embodied therewith, the program instructions executable to perform the methods of the above first aspect.

The summary clause does not necessarily describe all of the features of the embodiments of the present invention. The present invention may also be a combination or sub-combination of the features described above, including a combination of features from two or more of the aspects described above. The above and other features and advantages of the present invention will become more apparent from the following description of the embodiments, taken in conjunction with the accompanying drawings.

BRIEF DESCRIPTION OF THE DRAWINGS

FIG. 10 shows a weight table according to an embodiment of the present invention.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
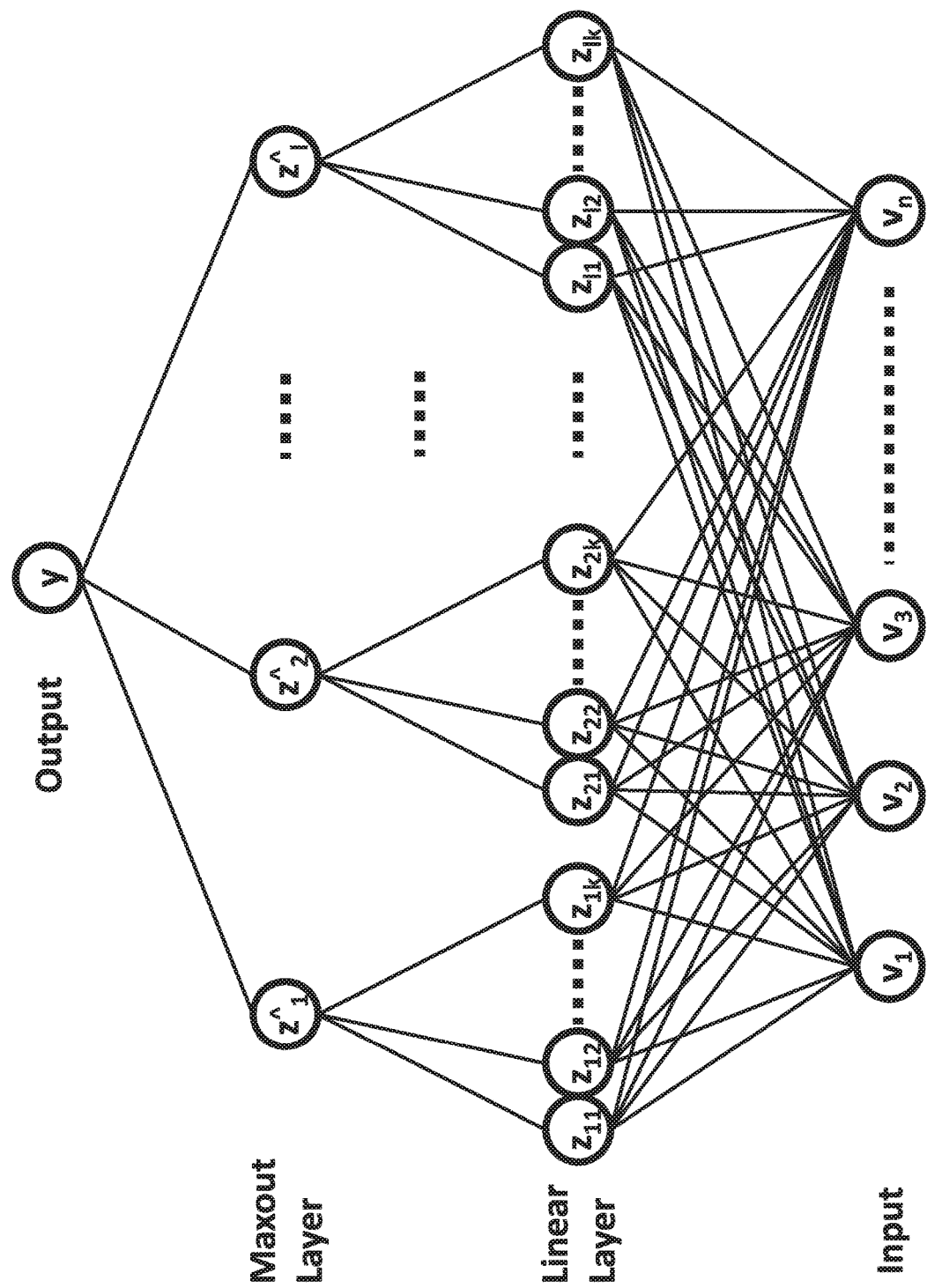
FIG. 1 shows an exemplary configuration of a neural network processed according to an embodiment of the present invention.

FIG. 1 shows an exemplary configuration of a neural network, according to an embodiment of the present invention. As shown in FIG. 1, the neural network may include at least one linear layer and at least one maxout layer. The linear layer includes l groups (l is a positive integer), each of which may include a plurality linear nodes (e.g., $z_{11}$, $z_{12}$, ..., $z_{1k}$ in the first group). The maxout layer includes l maxout nodes, each of which is connected to the plurality of linear nodes in a corresponding group.

Each linear node of the plurality of linear nodes is connected to a plurality of inputs $v_1$, $v_2$, ..., $v_n$, and performs linear computation based on values of the plurality of inputs $v_1$, $v_2$, ..., $v_n$. The plurality of inputs may be obtained from one or more of image data. Each linear node may provide its connected maxout node with a result of its linear computation as an output value. Each maxout node selects a maximum value from output values from k outputs from the k linear nodes connected to the maxout node itself, and provides node(s) in a next layer with the maximum value. The maximum value may be further processed by the node(s) in the next layer in the neural network. The last layer in the neural network may output a result of classification or cognition based on the plurality of inputs, such as a classification of the image data.

According to embodiments of the present invention, at least part of the linear computation of the plurality of linear nodes is terminated as explained below. Therefore, computational resource and time required to obtain the maximum value may be reduced.

Figure 2:
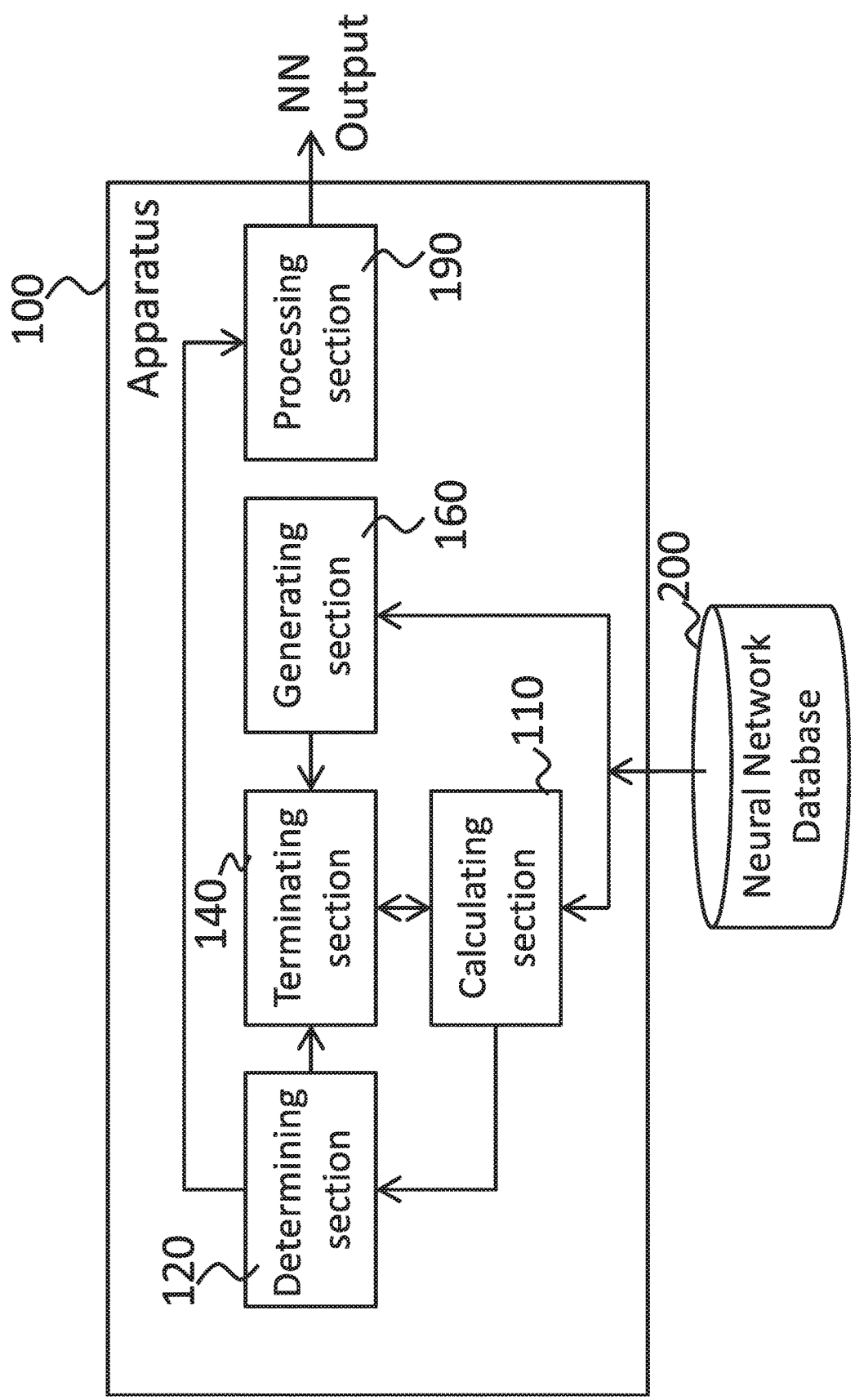
FIG. 2 shows an exemplary configuration of the apparatus 100 according to an embodiment of the present invention.

FIG. 2 shows an apparatus 100 according to an embodiment of the present invention. The apparatus 100 may process maxout networks (e.g., deep neural networks (DNNs), and convolutional neural networks (CNNs)), which include at least one maxout node. For example, the apparatus 100 may input values into the neural network including the maxout node and output values therefrom through the maxout node. The apparatus 100 can approximate any convex function with linear functions represented by the linear nodes.

The apparatus 100 may comprise a processor and one or more computer readable mediums collectively including instructions. The instructions, when executed by the processor, may cause the processor to operate as a plurality of operating sections. Thereby, the apparatus 100 may be regarded as comprising a calculating section 110, a determining section 120, a terminating section 140, a generating section 160, and a processing section 190.

The calculating section 110 may iterate calculation of output values of a plurality of linear nodes connected to a maxout node in a neural network. For example, the calculating section 110 may obtain a plurality of inputs of neural network and a plurality of weight values, which may be preliminarily stored in a neural network database 200. Each of the plurality of weight values may be associated with each of the plurality of inputs and each of the plurality of the linear nodes. In one embodiment, the apparatus 100 may include at least a part of the neural network database 200. In another embodiment, the apparatus 100 may include an input device and receive inputs from the input device.

The calculating section 110 may iterate calculation of an output value of each linear node for each input of the plurality of inputs. For example the calculating section 110 may calculate the output value of each linear node for a new input, by multiplying the new input of the plurality of inputs and corresponding weight value of the plurality of weight values, and adding the result of multiplication to the previous output value obtained for the previous inputs. The calculating section 110 may provide the determining section 120 and the terminating section 140 with the temporary output values of the plurality of linear nodes.

The calculation of the temporary output values by the calculating section 110 for a linear node may be terminated during the iterations. The calculating section 110 may continue the calculation of output values for the linear nodes that are not terminated. The calculating section 110 may finally calculate a final output value of each linear node that is not terminated, based on the plurality of inputs and the plurality of weight values. The calculating section 110 may obtain the final output value by multiplying each input of the plurality of inputs and corresponding weight value of the plurality of weight values and adding the result of multiplication.

The determining section 120 may determine a temporary maximum value, among the output values during the calculation of the output values by the calculating section 110. The determining section 120 may provide the terminating section 140 with the determined temporary maximum value. The determining section 120 may also provide the processing section 190 with the temporary maximum value determined for a final input as an output value of the maxout node.

The terminating section 140 may terminate the calculation of a final output value of at least a part of the plurality of linear nodes by the calculating section 110. For example, the terminating section 140 may terminate the calculation of the final output value of one linear node of the plurality of linear nodes, in response to a condition that a difference between the temporary maximum value and a temporary output value of the one linear node exceeds a threshold value during the calculation of the output values.

The generating section 160 may generate the threshold value used by the terminating section 140. For example, the generating section 160 may obtain the plurality of weight values and the plurality of inputs from the neural network database 200, and generate the threshold value based on at least one of the plurality of weight values and the plurality of inputs. The generating section 160 may provide the terminating section 140 with the threshold value.

The processing section 190 may process output value(s) from the maxout node(s). For example, the processing section 190 may perform computation of layer(s) subsequent to the maxout layer in the neural network by inputting the output value from the determining section 120. The processing section 190 may generate a final output of the neural network.

As explained above, the apparatus 100 may terminate calculation of at least a part of the plurality of linear nodes on a condition that a currently calculating linear node is estimated to be unable to overtake the temporary maximum value (i.e., an output of the current best linear node). Therefore, the apparatus 100 may reduce the computational cost and time to process the computation of the maxout node.

Figure 3:
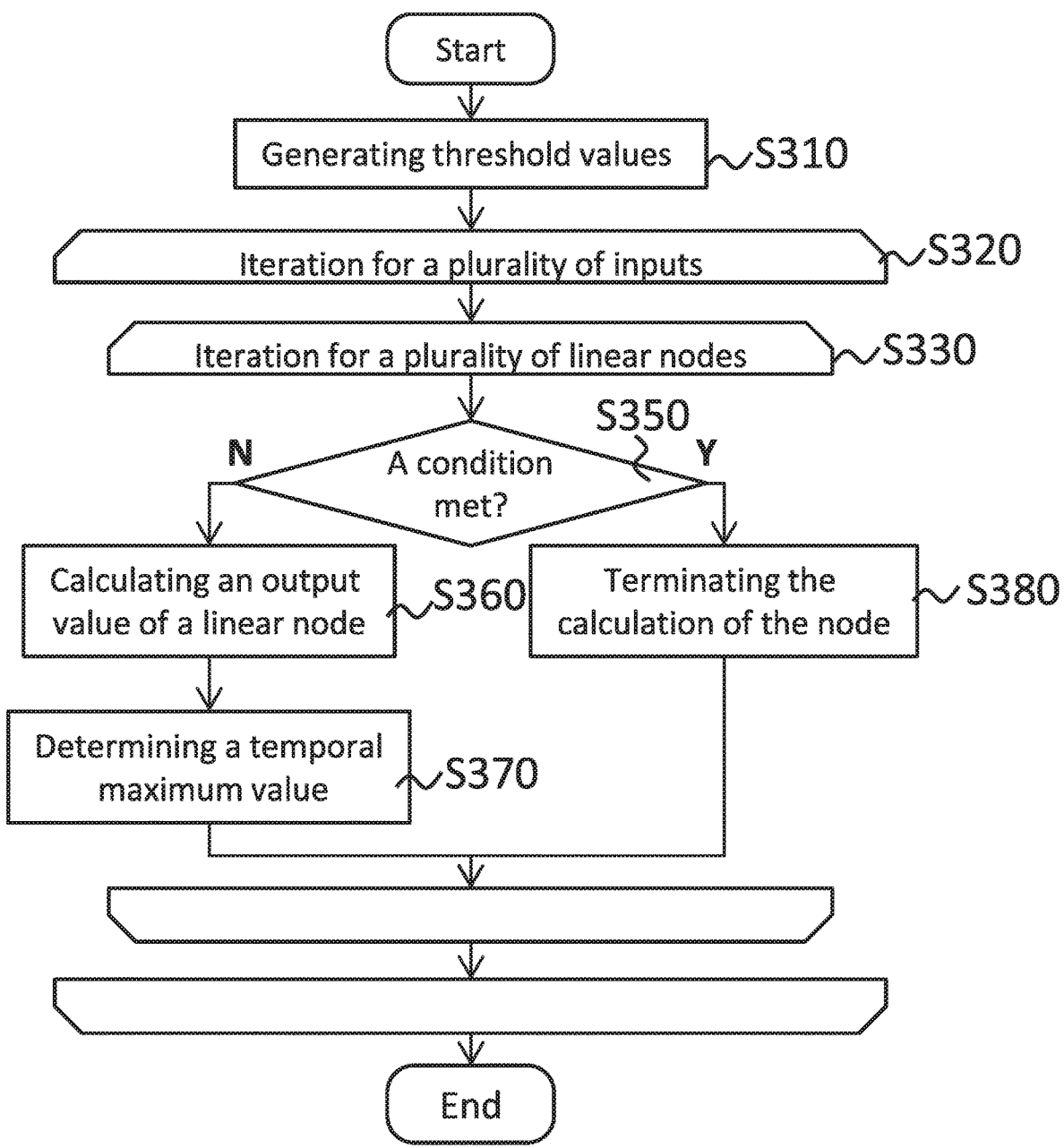
FIG. 3 shows an example operational flow of the apparatus 100 according to an embodiment of the present invention.

FIG. 3 shows an example operational flow of the apparatus 100 according to an embodiment of the present invention. The present embodiment describes an example in which an apparatus, such as the apparatus 100, performs the operations from S310 to S370, as shown in FIG. 3, but operation flow may be performed by other apparatuses. FIG. 3 shows one example of the operational flow of the apparatus 100 shown in FIG. 2, but the apparatus 100 shown in FIG. 2 is not limited to using this operational flow.

At S310, the apparatus 100, e.g. the generating section 160, may generate threshold values based on each maximum weight value among weight values defined between each of the plurality of inputs and the plurality of linear nodes.

For example, the generating section 160 may first calculate maximum weight differences between two linear nodes for each input in the plurality of inputs. For example, the generating section 160 may calculate a weight difference between the maximum weight value among weight values defined between one input and the plurality of linear nodes and the minimum weight value among weight values defined between the one input and the plurality of linear nodes, for each input of the plurality of inputs.

In one embodiment, the generating section 160 may obtain a weight value $w_{11,1}$ defined between a first input $v_1$ and a first node $z_{11}$ in a first group in the linear layer in a neural network such as shown in FIG. 1. The generating section 160 may also obtain a weight value $w_{12,1}$, a weight value $w_{13,1}, \ldots$, a weight value $w_{1k,1}$ for the first input $v_1$. The generating section 160 may identify the maximum weight value and the minimum weight value among $w_{11,1}$, $w_{12,1}, \ldots, w_{1k,1}$ for the first input $v_1$, and calculate a difference $\delta_1$ between the maximum weight value and the minimum weight value for the first input $v_1$. The generating section 160 may also calculate weight differences $\delta_2$, $\delta_3, \ldots, \delta_n$ for a second input $v_2$, a third input $v_3, \ldots$, and the final input $v_n$. The weight differences $\delta_1, \ldots, \delta_n$ are independent from the inputs $v_1, \ldots, v_n$.

In another embodiment, the generating section 160 may generate the weight differences $\delta_m$ in the m-th first loop, based on the maximum weight value among the plurality of weight values defined between the plurality of inputs except for the first part (e.g., $v_1, v_2, \ldots, v_m$) of the plurality of inputs of each of the plurality of linear nodes. For example, the generating section 160 may identify a temporary maximum weight value and a temporary minimum weight value among $w_{11,m+1}, w_{11,m+2}, \ldots, w_{11,n}, w_{12,m+1}, \ldots, w_{1k,n}$ and may calculate weight differences $\delta_m$ for m-th input by subtracting the temporary minimum weight value from the temporary maximum weight value.

The generating section 160 may calculate threshold values $\Delta_1, \Delta_2, \ldots, \Delta_n$, based on the weight differences $\delta_1$, $\delta_2, \ldots, \delta_n$ and the inputs $v_1, v_2, \ldots, v_n$. For example, the generating section may calculate the threshold values $\Delta_1$, $\Delta_2, \ldots, \Delta_n$, by performing the algorithm (1) shown below:

$$\Delta_{n+1} := 0$$

$$\text{for } m := n \text{ downto 1 do } \Delta_m := \Delta_{m+1} + \delta_m |v_m| \quad (1)$$

In other embodiments, the generating section 160 may generate the threshold value based on a maximum weight value among the plurality of weight values defined between the plurality of inputs and each of the plurality of linear nodes. For example, the generating section 160 may identify one common maximum weight value and one common minimum weight value among $w_{11,1}, w_{11,2}, \ldots, w_{11,n}$, $W_{12,1}, \ldots, w_{1k,n}$ and may calculate a common weight difference $\delta_c$ for all inputs by subtracting the common minimum weight value from the common maximum weight value. The generating section 160 may calculate the threshold values $\Delta_1, \Delta_2, \ldots, \Delta_n$, by performing the algorithm (2) shown below:

$$\Delta_{n+1} := 0$$

$$\text{for } m := n \text{ downto 1 do } \Delta_m := \Delta_{m+1} + \delta_c |v_m| \quad (2)$$

In other embodiments, the generating section 160 may use a constant (e.g., 1 or maximum value $v_{max}$ of the plurality of inputs $v_1, \ldots, v_n$) instead of $v_m$ to simplify the calculation of the threshold values, in the algorithms (1)-(2). In other embodiments, the generating section 160 may use a constant (e.g., 1, or a possible maximum difference between two weight values) instead of $\delta_m$ or $\delta_c$ to simplify the calculation of the threshold values, in the algorithms (1)-(2). In other embodiments, the generating section 160 may use a constant (e.g., 1) instead of $\delta_m |v_m|$ or $\delta_c |v_m|$ to simplify the calculation of the threshold values, in the algorithms (1)-(2).

Next, at S320, the apparatus 100, e.g. the calculating section 110, may start a first loop including processes of S330-S380. The calculating section may iterate the first loop for each of the plurality of inputs. For each first loop, the apparatus may process calculation of the plurality of linear nodes for an input. For example, the apparatus 100 may process the $1^{st}$ first loop for the first input $v_1$, the $2^{nd}$ first loop for the second input $v_2, \ldots,$ n-th first loop for the n-th input $v_n$. The input that is processed in a first loop may be referred to as "a target input."

At S330, the calculating section 110 may iterate a second loop including the processes of S350-S380, within the first loop. For each second loop, the apparatus may process calculation of output value of a linear node based on the target input. For example, the apparatus 100 may iterate calculation of output value of a linear node included in a target set L in second loops based on the target input. The target set L may initially include k linear nodes. In one embodiment, the apparatus 100 may iterate calculation of the first linear node in the $1^{st}$ second loop, the second linear node in the $2^{nd}$ second loop, $\ldots,$ the k-th linear node in the k-th second loop. A linear node that is processed in the second loop may be referred to as "a target node."

At S350, the apparatus 100, e.g. the terminating section 140, may determine whether a condition for terminating the calculation of an output value by the target node is met. For example, in the i-th (i=1, $\ldots,$ k) second loop in the m-th (m=1, $\ldots,$ n) first loop, the terminating section 140 may determine whether a condition that a difference between the temporary maximum value $z_t\hat{}_{m-1}$ and a temporary output value $z_t\hat{}_{m-1}$ of the i-th linear node exceeds the m-th threshold value $\Delta_m$, is met. In one embodiment, the values of $z_t\hat{}_0$ and $z_{1i,0}$ may be preset to 0.

The terminating section 140 may proceed with S360 if it is determined that the condition is met, and may proceed with S380 if it is determined the condition is not met.

At S360, the calculating section 110 may calculate a temporary output value of the target node for a first part of the plurality of inputs, which includes the target input and inputs before the target input. For example, the calculating section may calculate a temporary output value $z_{1i,m}$ of the i-th linear node for the m inputs (e.g., $v_1, v_2, \ldots, v_m$) in the i-th second loop in the m-th first loop. In one embodiment, the calculating section 110 may calculate $z_{1i,m}$ by performing the algorithm (3) shown below:

$$z_{1i,m} := z_{1i,m-1} + w_{i,m} v_m \quad (3)$$

The calculating section 110 may provide the determining section 120 and the terminating section 140 with the calculated temporary output value.

Next, at S370, the determining section 120 may determine for the first part (e.g., $v_1, v_2, \ldots, v_m$) of the plurality of inputs, the temporary maximum value used in a next first loop. For example, the determining section 120 may compare the temporary output value $z_{1i,m}$ with a previous maximum value $z_t\hat{}_{m-1}$. If the temporary output value $z_{1i,m}$ is larger than the previous maximum value $z_t\hat{}_{m-1}$, then the determining section 120 may set the temporary output value $z_{1i,m}$ as a value of the temporary maximum value $z_t\hat{}_m$, and if not, the determining section 120 may set the previous maximum value $z_t\hat{}_{m-1}$ as the value of the temporary maximum value $z_t\hat{}_m$.

At S370 in the final second loop of each first loop, the determining section 120 may provide the terminating section 140 with the temporary maximum value $z_t\hat{}_m$, which is used at S350 in the next first loop. At S370 in the final second loop in the final first loop, the determining section 120 may provide a processing section such as the processing section 190 with the temporary maximum value $z_t\hat{}_n$ as an output value of the maxout node (e.g., $z_t\hat{}_1$).

At S380, the terminating section 140 may terminate the calculation of a final output value of the target node. For example, the terminating section 140 may terminate remaining multiplication and accumulation of the calculation of the final output value of the m-th linear node in the m-th second loop. In one embodiment, the terminating section 140 may terminate the calculation of the final output value of the m-th linear node by removing the m-th linear node from the target set L. Thereby, the apparatus 100 may not process a second loop for the removed m-th linear node in a next first loop, and may save the computation resources and time for the removed linear node(s).

As explained above, according to the embodiment of FIG. 3, the apparatus may calculate output values of the plurality of linear nodes in the second loop for each linear node, in the first loop for each input. In this embodiment, during the operational flow, the calculating section 110 may calculate, for a first part (e.g., $v_1, v_2, \ldots, v_{m-1}$) of the plurality of inputs, temporary output values of the plurality of linear nodes during m iterations of the first loop, and the determining section 120 may determine, for the first part (e.g., $v_1, v_2, \ldots, v_{m-1}$) of the plurality of inputs, the temporary maximum value $z_t\hat{}_{m-1}$ by identifying the largest output value from the temporary output values calculated by the calculating section 110 for the latest input $v_{m-1}$ in the first part of the plurality of inputs. In one embodiment, the terminating section 140 may terminate the calculation of output values including the final output value from the first linear node $z_{1i}$ in response to a condition that a difference between the temporary maximum value $z_t\hat{}_{m-1}$ and a temporary output value $z_{1i,m-1}$ of the first linear node $z_{1i}$ for the first part of the plurality of inputs exceeds the threshold value $\Delta_m$.

According to the embodiment explained in relation to FIG. 3, an output value of one maxout node (e.g., $\hat{z}_1$) may be obtained by performing the processes of S310-S380. In other embodiments, the apparatus 100 may perform a plurality of iterations of the processes of S310-S380 to obtain a plurality of output values of a plurality of maxout nodes (e.g., $\hat{z}_1, \hat{z}_2, \ldots, \hat{z}_1$).

Figure 4:
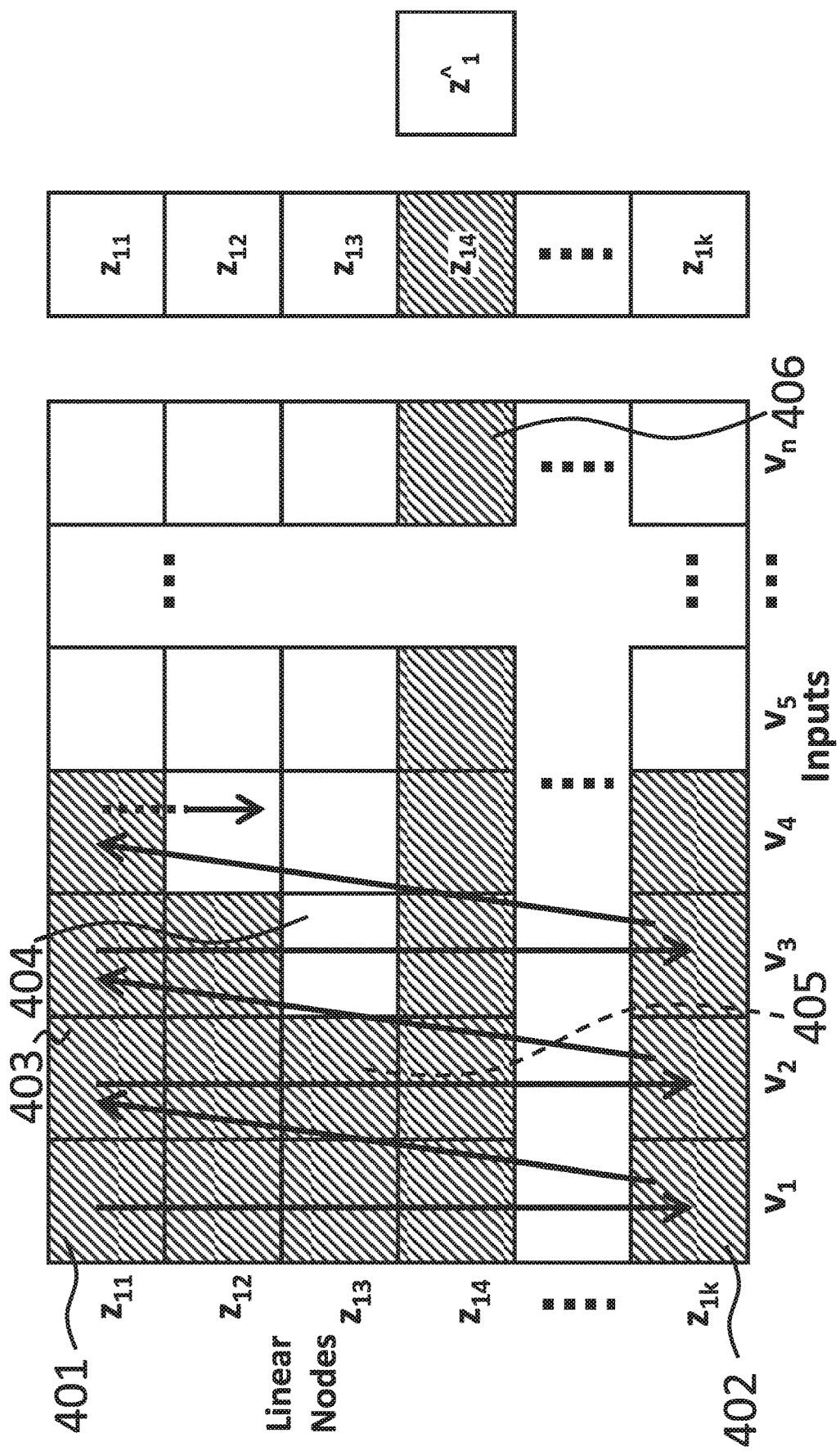
FIG. 4 shows an exemplary configuration according to the example in FIG. 3.

FIG. 4 shows an exemplary configuration according to the example in FIG. 3. FIG. 4 shows a matrix in which linear nodes (e.g., $z_{11}, z_{12}, \ldots, z_{1k}$) are arranged in rows, and inputs (e.g., $v_1, v_2, \ldots, v_n$) are arranged in columns. The columns correspond to the first loops and the rows correspond to the second loops in the operational flow in FIG. 3, and each entry in the matrix corresponds to one of the second loops in the first loops. Hatched entries in the matrix represent processes of computation of each second loop that are performed without termination, and not-hatched entries represent processes of computation of each second loop that are skipped due to termination.

The apparatus may start the calculation of the first linear node $z_{11}$ for the first input $v_1$ as shown as 401. The apparatus may proceed with iterations of the second loops in the $1^{st}$ first loop, which corresponds to the first column of $v_1$. After the final second loop (shown as 402) in the $1^{st}$ first loop, the apparatus may proceed with iterations of the second loops in the $2^{nd}$ first loop, which corresponds to the first column of $v_2$, and first calculate an output value of the first linear node $z_{11}$ for the second input $v_2$ as shown as 403. The output value for the third linear node $z_{13}$ for the second input value $v_2$ is shown as shown as 405

The apparatus may terminate the calculation of output values of the third linear node $z_{13}$ for the third input value $v_3$ and following input values $v_4, v_5, \ldots, v_n$ of the third linear node $z_{13}$, in response to a condition that the decision of S350 is positive at the $3^{rd}$ second loop in the $3^{rd}$ first loop (as shown as 404). For example, at S350 in the iteration of the second loop corresponding to 404, the apparatus may determine whether a difference between the temporary output value $(z_{13,2})$ of the third linear node $z_{13}$ and the temporary maximum value $(\hat{z}_{t\,2})$ exceeds the threshold value $\Delta_3$.

The threshold value may correspond to a value of a possible future difference between the target node $(z_{13})$ and a linear node outputting the temporary maximum value, in the most optimistic scenario. Therefore, if the difference between the temporary maximum value and the temporary output value of the target node exceeds the threshold, the target node never overtakes the linear node outputting the temporary maximum value. According to an embodiment of the invention, in such case, the apparatus may terminate current and future calculation for the target node $(z_{13})$ in order to avoid unnecessary computation. Thus, as shown in FIG. 4, calculations of output values of the third node $(z_{13})$ are not performed due to the termination.

The apparatus completes calculation of output values of at least one linear node for all inputs. In the embodiment of FIG. 4, the apparatus continues calculation of output values of the fourth linear node $(z_{14})$ and terminates calculation of other linear nodes. After iterations of the first loops (as shown as 406), the apparatus may determine the final output value (i.e., the temporary maximum value) of the fourth linear node $(z_{14})$ as an output value of the maxout node $\hat{z}_1$.

Without terminating calculation of the linear node, the calculating section performs calculations of all inputs ($v_1, v_2, \ldots, v_n$) for all inputs ($z_{11}, z_{12}, \ldots, z_{1k}$), which correspond to k×n entries (i.e., k×n iterations of the second loops) in the matrix in FIG. 4. However, according to the embodiment, the calculating section performs only part of the calculations, which correspond the hatched entries in the matrix. According to the embodiment of FIG. 4, the apparatus may calculate output values of the plurality of output values in parallel.

In relation to embodiments of FIG. 2-4, the calculating section or other element(s) in the apparatus may sort the plurality of inputs in descending order. For example, the calculating section may sort the plurality of inputs in descending order before starting iterations of the first loop at S320, such that inputs are processed in descending order in the iterations of the first loops.

If relatively large outputs are allocated in late in the first loops, the threshold values $\Delta_m$ tend to be large and thus calculation of only a fewer linear nodes may be terminated. However, according to this embodiment, the apparatus may reduce the threshold values $\Delta_m$ in an early stage of the first loops, and thus improve efficiency of computation of the maxout node by terminating relatively large number of linear nodes at early stage of iterations of the first loops.

Figure 5:
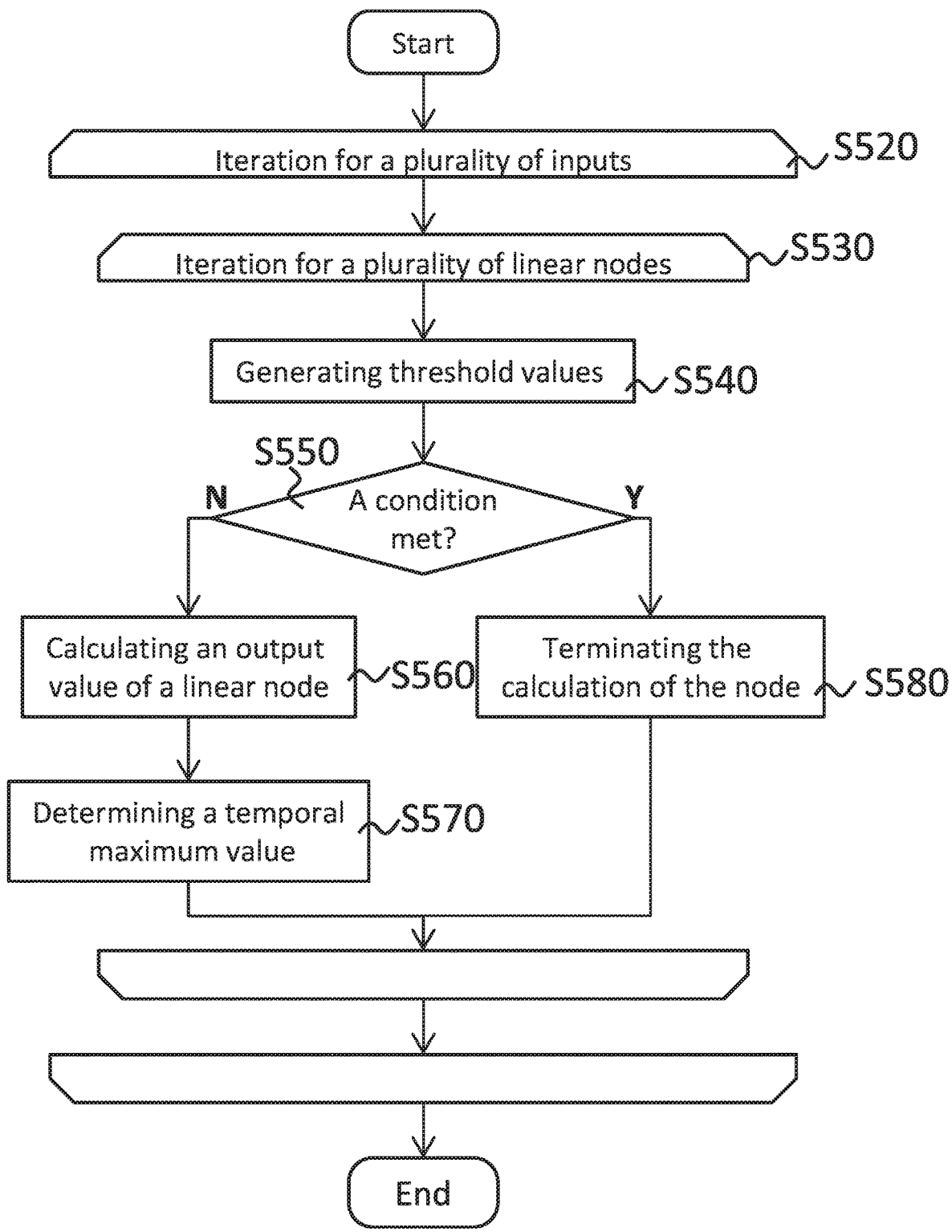
FIG. 5 shows another exemplary operational flow of the apparatus 100 according to an embodiment of the present invention.

FIG. 5 shows another exemplary operational flow of the apparatus according to an embodiment of the present invention. In this embodiment, the apparatus may generate threshold values within the second loop. Processes of S520, S530, S550, S560, S570, and S580 may correspond to the processes of S320, S330, S350, S360, S370 and S380 of FIG. 3. The apparatus may perform a process of S540 before S550 in the second loop comprising S530-S580.

At S540, the generating section may generate the threshold value used at S550 in the same second loop. For example, the generating section may generate the threshold value $\Delta_m$ in the m-th first loop, based on the maximum weight value among the plurality of weight values defined between each input of the plurality of input and not-terminated linear nodes of the plurality of linear nodes. In one embodiment, the generating section may identify the temporary maximum weight value and the temporary minimum weight value among $w_{11,m}, w_{14,m}, \ldots, w_{1k,m}$ (in which the linear nodes $z_{12}, z_{13}, \ldots$ are terminated at the m-th first loop) and may calculate weight differences $\delta_m$ for m-th input by subtracting the temporary minimum weight value from the temporary maximum weight value. The generating section may calculate the threshold values $\Delta_m, \Delta_{m+1}, \Delta_{m+2}, \ldots, \Delta_n$, by performing a algorism (4) shown below:

$$\Delta_{n+1} := 0$$

$$\text{for } m' := n \text{ downto } m \text{ do } \Delta_m := \Delta_{m'+1} + \delta_m |v_{m'}| \qquad (4)$$

At S570 in the final second loop in the final first loop, the determining section may provide the processing section with the temporary maximum value $\hat{z}_{t\,n}$ as an output value of the maxout node (e.g., $\hat{z}_1$).

According to the embodiment of FIG. 5, the apparatus can generate the threshold values based on the weight values of linear nodes that are not terminated. Therefore, the apparatus may terminate more linear nodes at S380, thereby further improve efficiency of the operation of the apparatus.

Figure 6:
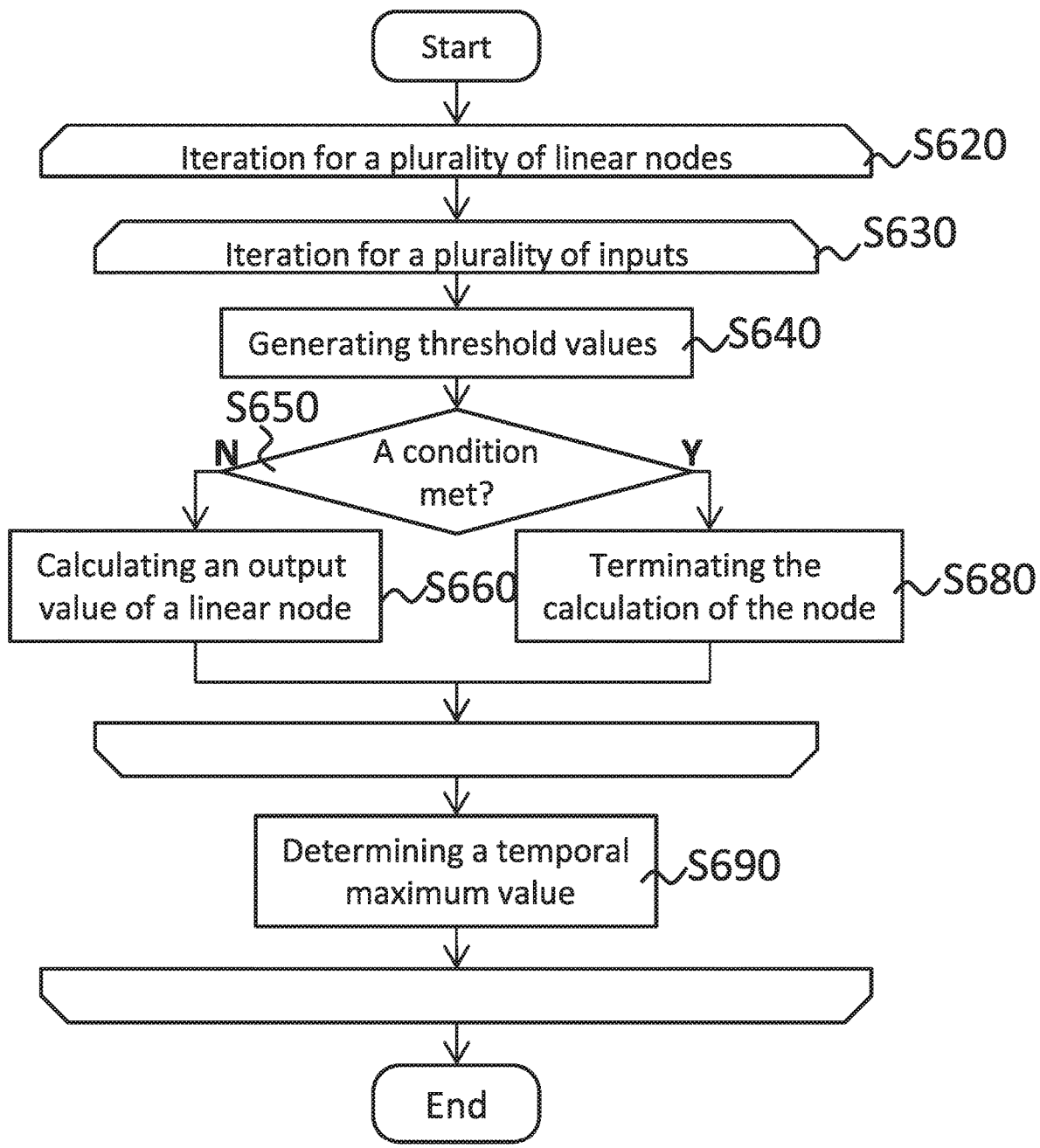
FIG. 6 shows another exemplary operational flow of the apparatus 100 according to an embodiment of the present invention.

FIG. 6 shows another exemplary operational flow of the apparatus according to an embodiment of the present invention. In this embodiment, at S620, the calculating section may start a first loop including processes of S630-S690. The calculating section may iterate the first loop for each of the plurality of linear nodes. For each first loop, the apparatus may process calculation of the plurality of inputs for a linear node.

At S630, the calculating section may iterate a second loop including processes of S640-S680, within the first loop. For example, the apparatus may iterate, in the second loops, calculation of output value of the same linear node included in the target set L. In one embodiment, the apparatus may iterate, in a first loop, calculation of a linear node based on the first input in the $1^{st}$ second loop, calculation of the same linear node based on the second input in the $2^{nd}$ second loop, . . . , calculation of the same linear node based on the n-th input in the n-th second loop.

At S640, the generating section may generate the threshold value $\Delta_m$ in the m-th second loop, based on at least one of the plurality of weight values and the plurality of inputs. For example, the generating section may generate the threshold value $\Delta_m$, based on each of the maximum weight values among weight values (e.g., $w_{11,1}$, $w_{11,2}$, . . . , $w_{11,n}$, $w_{12,1}$, . . . , $w_{1k,n}$) defined between each of the plurality of inputs and the plurality of linear nodes (e.g., $z_{11}$, $z_{12}$, . . . , $z_{1k}$).

In one embodiment, the generating section may identify the temporary maximum weight values $w^{max}_m$, $w^{max}_{m+1}$, . . . , $w^{max}_n$ among ($w_{11,m}$, $w_{12,m}$, . . . , $w_{1k,m}$), ($w_{11,m+1}$, $w_{12,m+1}$, . . . , $w_{1k,m+1}$), . . . , $w_{11,n}$, $w_{12,n}$, . . . , $w_{1k,n}$). The generating section may calculate the threshold values $\Delta_m$, $\Delta_{m+1}$, $\Delta_{m+2}$, . . . , $\Delta_n$, by performing the algorism (5) as shown below:

$$\Delta_{n+1} := 0$$

$$\text{for } m' := n \text{ downto } m \text{ do } \Delta_m := \Delta_{m'+1} + w^{max}_{m'} |v_{m'}| \quad (5)$$

Processes of S650, S660, and S680 may correspond to the processes of S350, S360, and S380 of FIG. 3. For example, at S650, the terminating section may determine whether a condition that a difference between the temporary maximum value $z_{t\,i-1}^\wedge$ and a temporary output value $z_{1(i-1)}$ of the linear node exceeds the threshold value $\Delta_m$, is met. For example at S660, the calculating section may calculate output values of the i-th linear node for the m-th input at the m-th second loop in the i-th first loop, after calculating output values of a first part (e.g., $z_{11}$, $z_{12}$, . . . , $z_{1(i-1)}$) of the plurality of linear nodes in preceding loops. For example, at S680, the terminating section may terminate the calculation of an output value from the target node ($z_{1i}$) excluded from the first part (e.g., $z_{11}$, $z_{12}$, . . . , $z_{1(i-1)}$) of the plurality of linear nodes.

At S690, the determining section may determine the temporary maximum value by selecting a maximum output value of a new first part (e.g., $z_{11}$, $z_{12}$, . . . , $z_{1i}$) of the plurality of linear nodes as the temporary maximum value. In one embodiment, the determining section may first identify all linear nodes (or second loops) in the first part (e.g., $z_{11}$, $z_{12}$, . . . , $z_{1i}$), of which calculation is not terminated at S680, and select the maximum output value among the final output values of the identified nodes as the temporary maximum value $z_{t\,i}^\wedge$, which is used through the next first loop.

As explained above, according to the embodiment of FIG. 6, the calculating section may calculate output values of a first part ($z_{11}$, $z_{12}$, . . . , $z_{1(i-1)}$) of the plurality of linear nodes during a iterations of a part of the first loops. The determining section may determine the temporary maximum value $z_{t\,i}^\wedge$, by selecting a maximum output value of the first part of the plurality of linear nodes as the temporary maximum value. The terminating section may terminate the calculation of an output value from a first linear node $z_{1i}$ excluded from the first part ($z_{11}$, $z_{12}$, . . . , $z_{1(i-1)}$) of the plurality of linear nodes (e.g., the linear node that is next to the last linear node of the first part of the plurality of linear nodes), in response to a condition that a difference between the temporary maximum value $z_{t\,i}^\wedge$ and a temporary output value $z_{1i}$ of the first linear node exceeds the threshold value $\Delta_m$.

In one embodiment in relation to FIG. 6, the process of S640 may be performed before S620.

Figure 7:
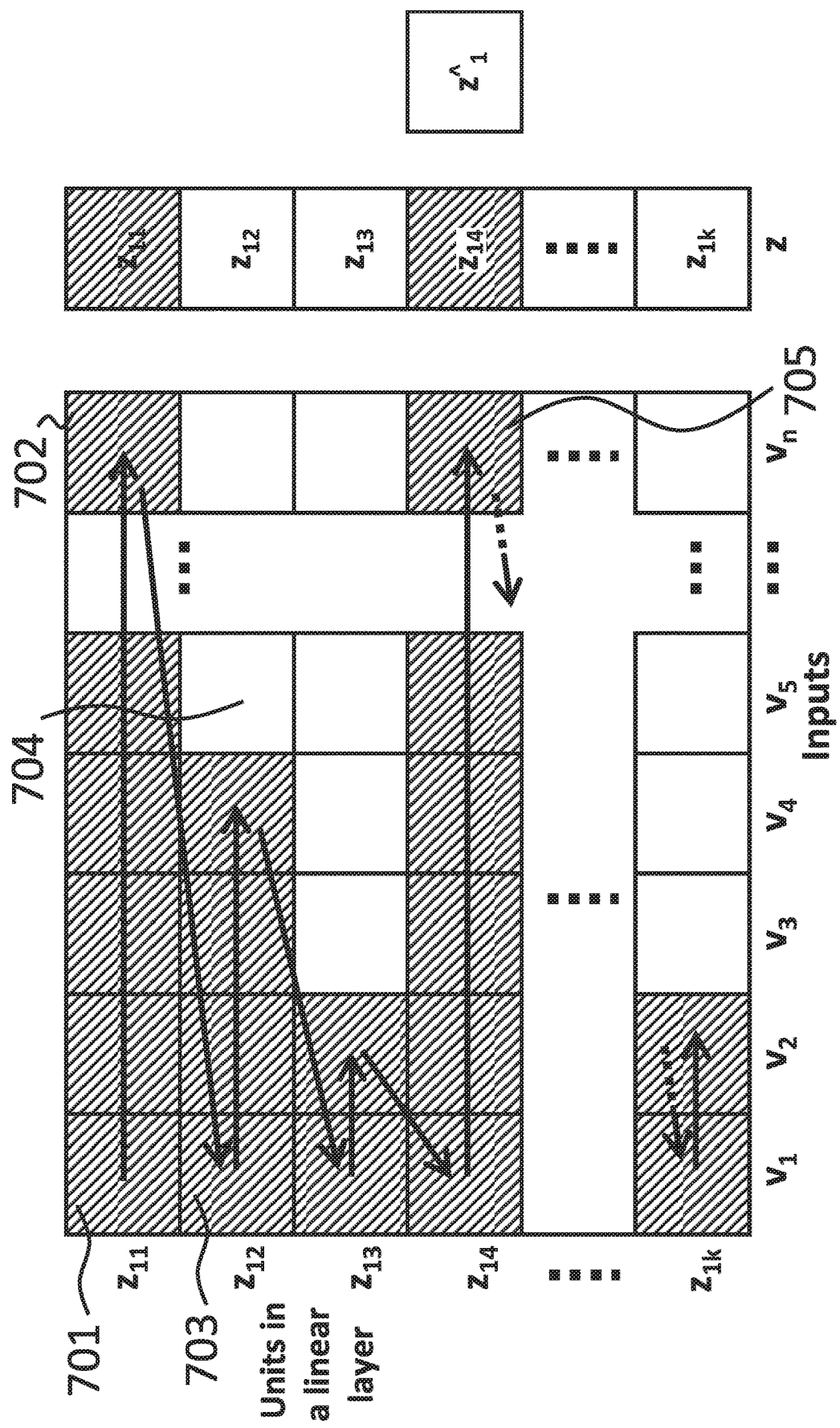
FIG. 7 shows an exemplary configuration according to the example in FIG. 6.

FIG. 7 shows an exemplary configuration according to of the example in FIG. 6. FIG. 7 shows a matrix similar to that of FIG. 4. The apparatus may start the calculation of the first linear node $z_{11}$ for the first input $v_1$ as shown as 701. The apparatus may proceed with iterations of the second loops in the $1^{st}$ first loop, which corresponds to the linear node $z_{11}$.

Since the temporary maximum value $z_{t\,0}^\wedge$ is preset to 0 before the $1^{st}$ first loop, the apparatus perform n iteration of second loops for n inputs in the $1^{st}$ first loop without termination (shown as 702). After the iterations of the second loops in the $1^{st}$ first loop, the apparatus may set the temporary maximum value $z_{t\,1}^\wedge$ to a final output value of the first linear node $z_{11}$, and proceed with iterations of the second loops in the $2^{nd}$ first loop. The apparatus then calculates an output value of the second linear node $z_{12}$ for the first input $v_1$ as shown as 703.

The apparatus may terminate the calculation of output values of the second linear node $z_{12}$ for the fifth input value $v_5$ and following input values $v_6$, $v_7$, . . . , $v_n$ of the second linear node $z_{12}$, in response to a condition that the decision of S350 is positive at the $5^{th}$ second loop in the $2^{nd}$ first loop (as shown as 704). For example, at S650 in the iteration of the second loop corresponding to 704, the apparatus may determine whether a difference between the temporary output value ($z_{12,4}$) of the third linear node $z_{12}$ and the temporary maximum value ($z_{t\,1}^\wedge$, which is equal to the final output value $z_{11}$) exceeds the threshold value $\Delta_m$.

The apparatus perform n iteration of second loops for n inputs in the $4^{th}$ first loop without termination (shown as 705). The apparatus may update the temporary maximum value $z_{t\,4}^\wedge$ to a final output value of the fourth linear node $z_{14}$ in response to a condition that the output value of the fourth linear node $z_{14}$ is larger than the present temporary maximal value $z_{t\,3}^\wedge$.

According to an embodiment of FIG. 7, the apparatus may sequentially calculate output values of the plurality of linear nodes, and terminate current and future calculation for the target node in order to avoid unnecessary computation for the similar reason explained in FIG. 4.

Figure 8:
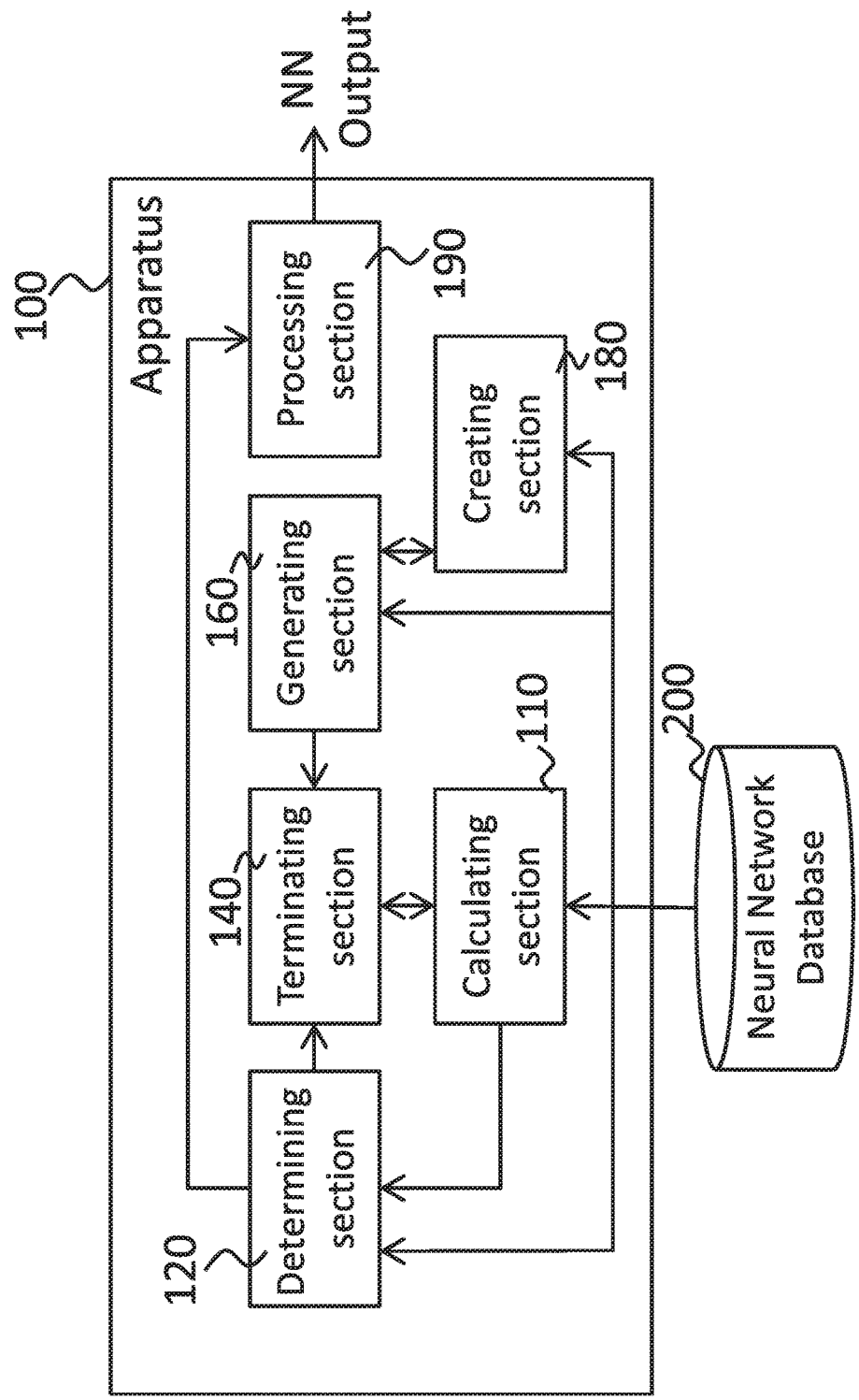
FIG. 8 shows another exemplary configuration of the apparatus 100 according to an embodiment of the present invention.

FIG. 8 shows another exemplary configuration of the apparatus 100 according to an embodiment of the present invention. The apparatus 100 shown in FIG. 8 may further comprise a creating section 180 further to the elements explained in relation to the apparatus 100 in FIG. 2. The other elements in the apparatus 100 in FIG. 8 may be similar to the elements shown in FIG. 2.

The creating section 180 may create, for at least a part of the plurality of inputs (referred to as "a first input") of the plurality of inputs, a weight table including weight values between the first input and the plurality of linear nodes, the weight values being sorted in descending order. The creating section 180 may provide the generating section 160 with the created weight table.

According to one embodiment, the generating section 160 may generate the threshold value by using the maximum weight value from the weight table between the first input and the plurality of linear nodes excluded from the first part of the plurality of linear nodes. The generating section 160 may disable the maximum weight value in the weight table in response to a condition that the corresponding linear node is added to the first plurality of linear nodes.

Figure 9:
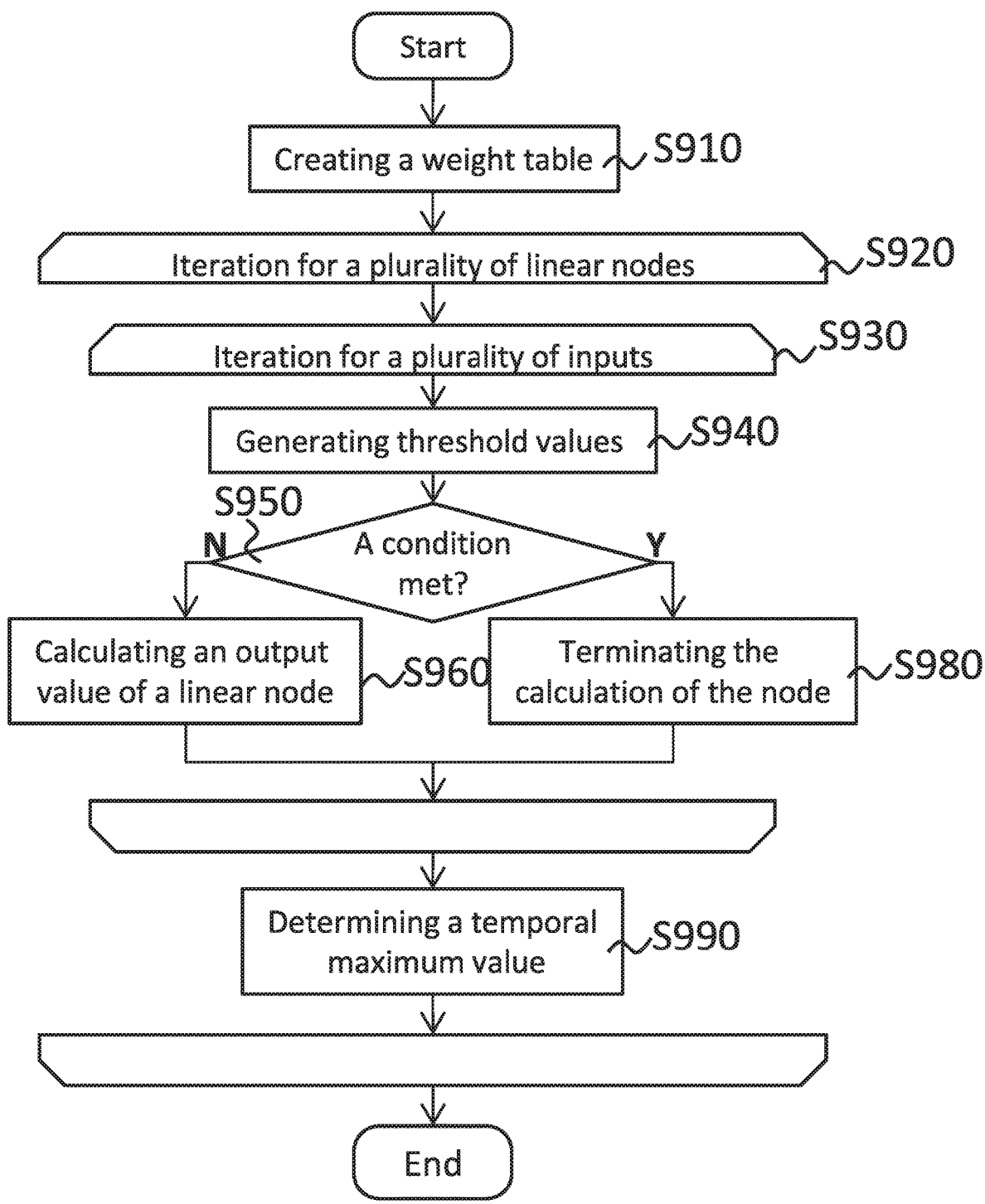
FIG. 9 shows an exemplary operational flow of the apparatus 100 according to an embodiment of the present invention.

FIG. 9 shows an exemplary operational flow of the apparatus according to an embodiment of the present invention. In this embodiment, the creating section may create a weight table. Processes of S920, S930, S950, S960, S980, and S990 may correspond to the processes of S620, S630, S650, S660, S680 and S690 of the embodiment of FIG. 6. The apparatus may first perform a process of S910 before S920.

At S910, a creating section such as the creating section 180 may create, for each input of the plurality of inputs, a weight table including weight values between the each input and the plurality of linear nodes, wherein the weight values are arranged in descending order for each input in the weight table.

At S940, the generating section may generate the threshold value $\Delta_m$, based on each of the maximum weight values among weight values (e.g., $w_{1i,1}$, $w_{1i,2}$, ..., $w_{1(i+1),1}$, $w_{1(i+1),2}$, ..., $w_{1k,n}$) defined between each of the plurality of inputs and the remaining nodes (e.g., $z_{1i}$, $z_{1(i+1)}$, ..., $z_{1k}$) excluded from the first part (e.g., $z_{11}$, $z_{12}$, ..., $z_{1i-1}$) of the plurality of linear nodes (e.g., $z_{11}$, $z_{12}$, ..., $z_{1k}$). The generating section may generate the threshold value $\Delta_m$, by using the maximum weight value that is not disabled, from the weight table between the each input and the plurality of linear nodes excluded from the first part (e.g., $z_{11}$, $z_{12}$, ..., $z_{1(i-1)}$) of the plurality of linear nodes.

In the embodiment, the generating section may identify the temporary maximum weight values $w^{max}_m$, $w^{max}_{m+1}$, ..., $w^{max}_n$ among ($w_{1i,m}$, $w_{1(i+1),m}$, ..., $w_{1k,m}$), ($w_{1i,m+1}$, $w_{1(i+1),m+1}$, ..., $w_{1k,m+1}$), ..., ($w_{1i,n}$, $w_{1(i+1),n}$, ..., $w_{1k,n}$). The generating section may calculate the threshold values $\Delta_m$, $\Delta_{m+1}$, $\Delta_{m+2}$, ..., $\Delta_n$, by performing the algorism (5) as shown below:

$$\Delta_{n+1} := 0$$

for $m' := n$ downto $m$ do $\Delta_m := \Delta_{m'+1} + w^{max}_{m'} |v_{m'}|$ (5)

At S990, in addition to the determination of the determining section, the generating section may disable the maximum weight value $w^{max}_m$ in m-th column in the weight table in response to a condition that the linear node corresponding to the maximum weight value $w^{max}_m$ is just added to the first part ($z_{11}$, ..., $z_{1i}$) of plurality of linear nodes, in the i-th first loop, and may select the second largest weight value in the m-th column in the weight table as an updated maximum weight value. In other words, for each input, the generating section may update the weight table such that the second largest weight value becomes the maximum weight value by eliminating the current maximum weight value in response to a condition that the latest linear node $z_{1i}$ corresponding to the i-th first loop provides the current maximum weight value.

Figure 10:
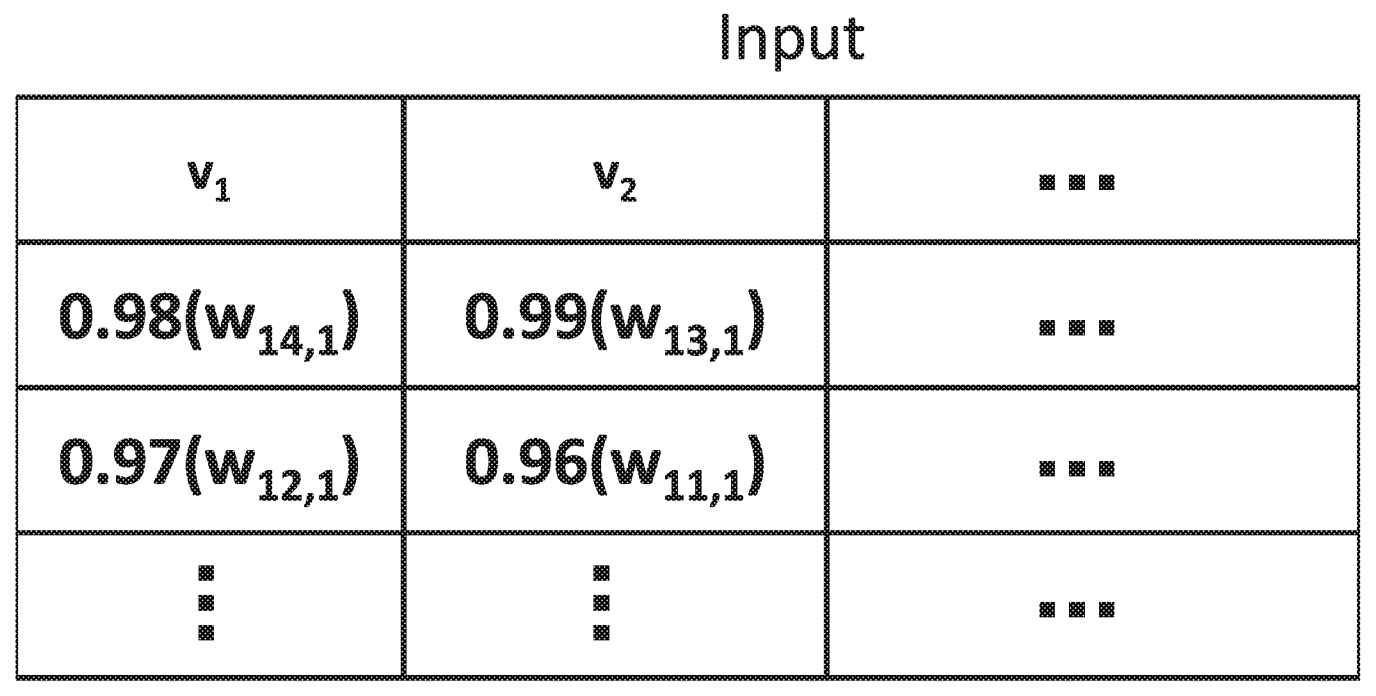

FIG. 10 shows a weight table according to an embodiment of the present invention. The weight table may include a plurality of weight values of the plurality of linear nodes for each input ($v_1$, $v_2$, ..., $v_n$). The plurality of weight values are sorted in descending order as shown in FIG. 10. The first column for the input $v_1$ includes a weight value $w_{14,1}$ which is 0.98 as the maximum weight value, and a weight value $w_{12,1}$ which is 0.97 as a second largest weight value. Now when a first loop of the linear node $z_{14}$ is completed (i.e., the linear node $z_{14}$ is included in the first part of the linear nodes), the generating section may disable the maximum weight value $w_{14,1}$ corresponding to the linear node $z_{14}$. Then the generating section may use the second largest weight value $w_{12,1}$ as a new maximum weight value.

In the embodiments explained in relation to FIGS. 3-5, 6 and 9, the calculating section may calculate the output value for two or more of inputs at once in every second loop in the first loop. For example, the calculating section may calculate the temporary output values of the plurality of linear nodes by adding the next two or more inputs to the first part of the plurality of inputs. In one embodiment, the calculating section may calculate the temporary output value of the linear node $z_{12}$ for the inputs $v_4$ and $v_5$, by adding a result of calculation with the inputs $v_4$ and $v_5$ to the previous temporary output value calculated for inputs $v_1$-$v_3$ at S360, S560, S660 or S960.

Figure 11:
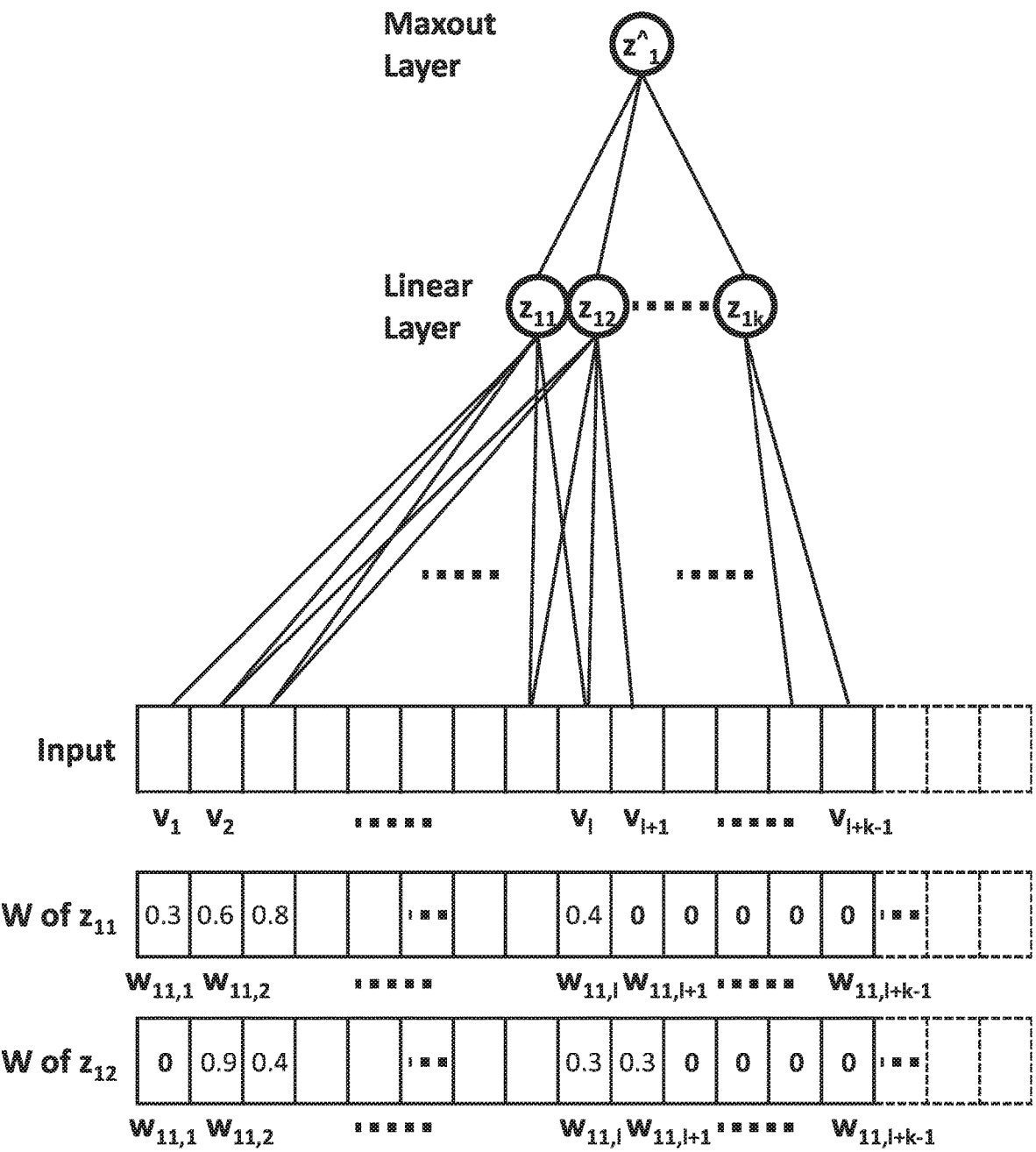
FIG. 11 shows an exemplary application of embodiments of the present invention to a convolutional neural network.

FIG. 11 shows an exemplary application of the present invention to a Convolutional Neural Network. FIG. 11 indicates a maxout layer and a linear layer included in Convolutional Neural Network (CNN). In one embodiment, the apparatus may calculate output values from a max pooling layer in CNN.

The max pooling layer may shift input values for each of the plurality of linear nodes. For example, the linear node $z_{11}$ may use input values [$v_1$, $v_2$, ..., $v_l$], the linear node $z_{12}$ may use input values [$v_2$, $v_3$, ..., $v_{l+1}$], ..., and the linear node $z_{1k}$ may use input values [$v_k$, $v_{k+1}$, ..., $v_{k+l+1}$] in the max pooling layer.

In order to handle such shifting input values, the apparatus may allocate 0 to weight values defined between each linear node, and input values that the each linear node does not use. For example, the apparatus may preliminarily set the weight values $w_{11,l+1}$, $w_{11,l+2}$, ..., $w_{11,l+k+1}$ of the linear node $z_{11}$ to 0, the weight values $w_{11,1}$, $w_{11,l+1}$, ..., $w_{11,l+k+1}$ of the linear node $z_{12}$ to 0 as shown in FIG. 11.

According to the embodiment, the apparatus can perform calculation of CNN by using weight vectors having the same configuration among the plurality of linear nodes despite the differences of inputs.

The above explained embodiments of the present invention may be performed during a training phase and/or a prediction phase of the neural network.

Figure 12:
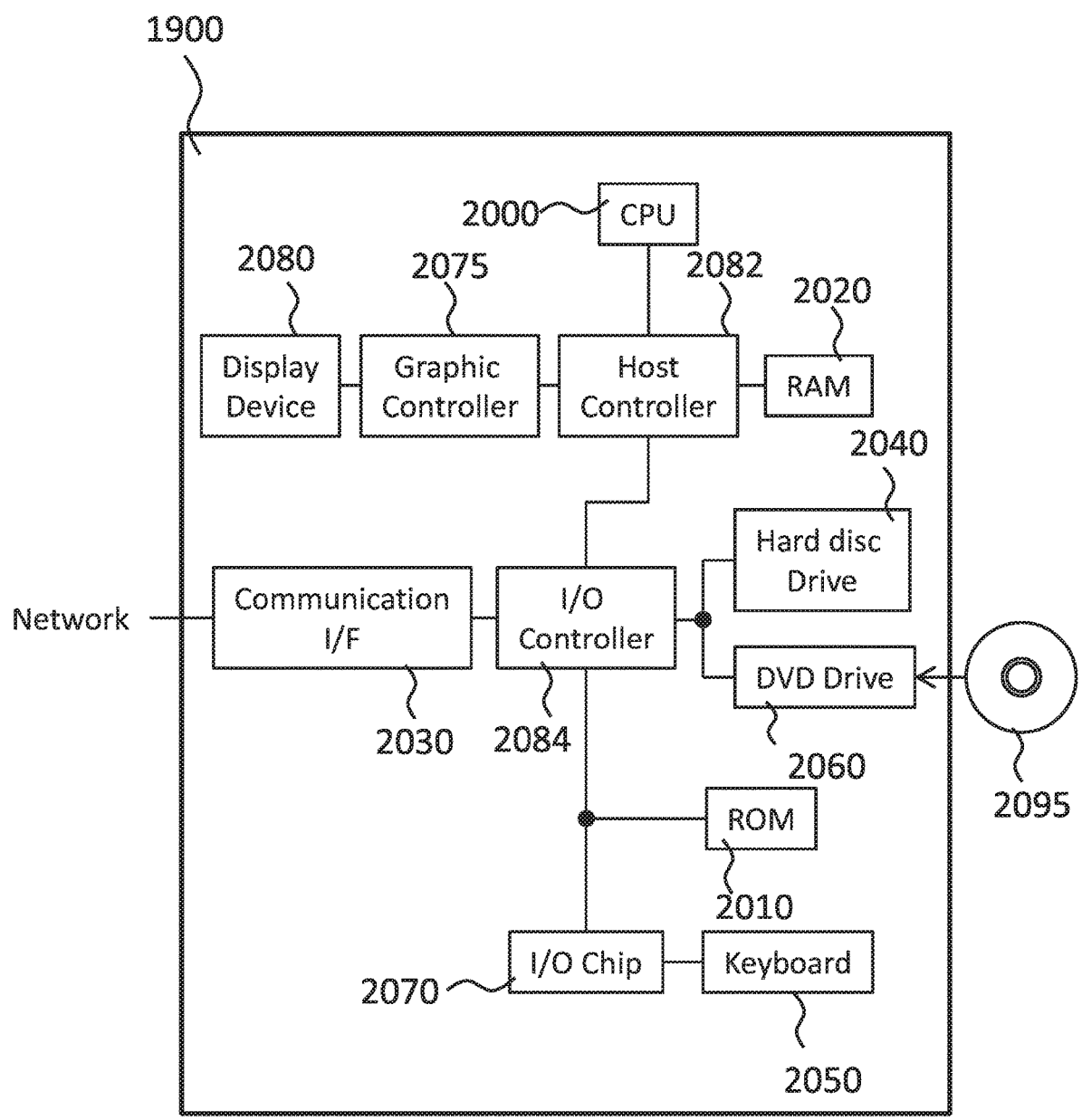
FIG. 12 shows an example of a computer 1900 in which the apparatus 100, the operational flow of FIGS. 2 and 8, and/or other embodiments of the claimed invention may be wholly or partly embodied.

FIG. 12 shows an example of a computer 1900 in which the apparatus 100, the operational flow of FIGS. 3, 5, 6, and 9, and/or other embodiments of the claimed invention may be wholly or partly embodied.

The computer 1900 according to the present embodiment includes a CPU 2000, a RAM 2020, a graphics controller 2075, and a display apparatus 2080, which are mutually connected by a host controller 2082. The computer 1900 also includes input/output units such as a communication interface 2030, a hard disk drive 2040, and a DVD-ROM drive 2060, which are connected to the host controller 2082 via an input/output controller 2084. The computer also includes legacy input/output units such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 may cause the computer 1900 to function as an apparatus, such as the apparatus 100 of FIG. 2 or 8. The program or module acts on the CPU 2000, to cause the computer 1900 to function as some or all of the sections, components, elements, etc. of the apparatus 100 of FIG. 2 or 8 (e.g., the calculating section 110, the determining section 120, the terminating section 140, the generating section 160, the creating section 180, the processing section 190, etc.).

A program that is installed in the computer 1900 can also cause the computer 1900 to perform an operational flow such as the operational flow of FIG. 3, 5, 6, or 9. Such a program may act on the CPU 2000 to cause the computer 1900 to perform some or all of the steps of FIG. 3, 5, 6, or 9 (e.g. generating threshold values S310, calculating an output value of a linear node S360, etc.)

The information processing described in these programs is read into the computer 1900 such as the apparatus 100 of FIGS. 2 and 8, to function as each section (e.g., the calculating section 110), resulting in the cooperation between the program or module and the above-mentioned various types of hardware resources. An apparatus or method may be constituted by realizing the operation or processing of information in accordance with the usage of the computer 1900.

For example, in response to communication between the computer 1900 and an external device, the CPU 2000 may execute a communication program loaded onto the RAM 2020, to instruct communication processing to a communication interface 2030, based on the processing described in the communication program.

The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060(DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc.

Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from a memory such as the RAM 2020, which includes various types of operations, processing of information, condition judging, search/replace of information, etc., as described in the present embodiment and designated by an instruction sequence of programs, and writes the result back to the memory such as the RAM 2020. For example, if performing condition judging, then the CPU 2000 may judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, the CPU 2000 may search for information in a file, a database, etc., in the recording medium. For example, if a plurality of entries, each having an attribute value of a first attribute is associated with an attribute value of a second attribute, are stored in a recording apparatus, then the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium, which may implement the storage section, may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize an improved computation in the maxout network.

What is claimed is:

1. A method comprising:
   calculating, using a processor, output values of a plurality of linear nodes connected to a maxout node in a neural network;
   calculating, using the processor, a temporary maximum value among the output values during the calculation of the output values;
   terminating a calculation of a final output value of each linear node of the plurality of linear nodes that satisfies a condition that a difference between the temporary maximum value and a temporary output value of that linear node exceeds a threshold value during the calculation of the output values; and
   continuing calculations of a final output value of non-terminated linear nodes of the plurality of linear nodes.

2. The method of claim 1, wherein each linear node of the plurality of linear nodes is connected to a plurality of inputs, and
   the calculating output values includes calculating a final output value of each linear node based on the plurality of inputs and a plurality of weight values, each of the plurality of weight values associated with each of the plurality of inputs and the linear node.

3. The method of claim 2, wherein the calculating the final output value from each linear node includes multiplying each input of the plurality of inputs and corresponding weight value of the plurality of weight values and adding the result of multiplication; and
   the terminating includes terminating remaining multiplication and accumulation of the calculation of the final output value.

4. The method of claim 3, wherein the calculating output values includes sorting the plurality of inputs in descending order.

5. The method of claim 2, wherein:
   the calculating output values includes calculating, for a first part of the plurality of inputs, temporary output values of the plurality of linear nodes;
   the calculating the temporary maximum value includes calculating, for the first part of the plurality of inputs, the temporary maximum value;
   the terminating includes terminating the calculation of the final output value from a linear node in response to a condition that a difference between the temporary maximum value and a temporary output value of the linear node for the first part of the plurality of inputs exceeds the threshold value.

6. The method of claim 5, further comprising: generating the threshold value based on at least one of the plurality of weight values and the plurality of inputs.

7. The method of claim 6, wherein the generating includes generating the threshold value based on each maximum weight value among weight values defined between each of the plurality of inputs and the plurality of linear nodes.

8. The method of claim 6, wherein the generating includes generating the threshold value based on a maximum weight value among the plurality of weight values defined between the plurality of inputs and each of the plurality of linear nodes.

9. The method of claim 6, wherein the generating includes generating the threshold value based on the maximum weight value among the plurality of weight values defined between the plurality of inputs except for the first part of the plurality of inputs of each of the plurality of linear nodes.

10. The method of claim 5, wherein the calculating output values includes adding the next two or more inputs to the first part of the plurality of inputs, and calculating the temporary output values of the plurality of linear nodes.

11. The method of claim 2, wherein
    the calculating output values includes calculating output values of a first part of the plurality of linear nodes;
    the calculating the temporary maximum value includes selecting a maximum output value of the first part of the plurality of linear nodes as the temporary maximum value; and
    the terminating includes terminating the calculation of an output value from a linear node excluded from the first part of the plurality of linear nodes in response to a condition that a difference between the temporary maximum value and a temporary output value of the linear node exceeds the threshold value.

12. The method of claim 11, further comprising: generating the threshold value based on at least one of the plurality of weight values and the plurality of inputs.

13. The method of claim 12, wherein the generating includes generating the threshold value based on each of the maximum weight values among weight values defined between each of the plurality of inputs and the remaining nodes excluded from the first part of the plurality of linear nodes.

14. The method of claim 13, comprising:
    creating, for a first input of the plurality of inputs, a weight table including weight values between the first input and the plurality of linear nodes, the weight values being sorted in descending order, and
    wherein the generating includes generating the threshold value by using the maximum weight value from the weight table between the first input and the plurality of linear nodes excluded from the first part of the plurality of linear nodes, and disabling the maximum weight value in the weight table in response to a condition that the corresponding linear node is added to the first plurality of linear nodes.

15. A non-transitory computer program product comprising one or more non-transitory computer readable storage mediums having instructions embodied therewith, the instructions being executable by a computer to cause the computer to:

calculate output values of a plurality of linear nodes connected to a maxout node in a neural network;

calculate a temporary maximum value among the output values during the calculation of the output values;

terminate a calculation of a final output value of each linear node of the plurality of linear nodes that satisfies a condition that a difference between the temporary maximum value and a temporary output value of that linear node exceeds a threshold value during the calculation of the output values; and continue calculations of a final output value of non-terminated linear nodes of the plurality of linear nodes.

16. The computer program product of claim 15, wherein each linear node of the plurality of linear nodes is connected to a plurality of inputs, and a final output value of each linear node is calculated based on the plurality of inputs and a plurality of weight values, each of the plurality of weight values associated with each of the plurality of inputs and the linear node.

17. The computer program product of claim 16, wherein calculating output values includes multiplying each input of the plurality of inputs and corresponding weight value of the plurality of weight values and adding the result of multiplication; and terminating includes terminating remaining multiplication and accumulation of the calculation of the final output value.

18. The computer program product of claim 17, wherein calculating output values includes sorting the plurality of inputs in descending order.

19. The computer program product of claim 16, wherein:

calculating output values includes calculating, for a first part of the plurality of inputs, temporary output values of the plurality of linear nodes;

calculating the temporary maximum value includes calculating, for the first part of the plurality of inputs, the temporary maximum value; and terminating the calculation includes terminating the calculation of the final output value from a linear node in response to a condition that a difference between the temporary maximum value and a temporary output value of the linear node for the first part of the plurality of inputs exceeds the threshold value.

20. The computer program product of claim 19, further comprising instructions executable by a computer to cause the computer to generate the threshold value based on at least one of the plurality of weight values and the plurality of inputs.

* * * * *